July 7, 1953 W. S. PRAEG 2,644,367
METHOD OF SHAPER CUTTING GEARS
Filed June 28, 1948 2 Sheets-Sheet 1
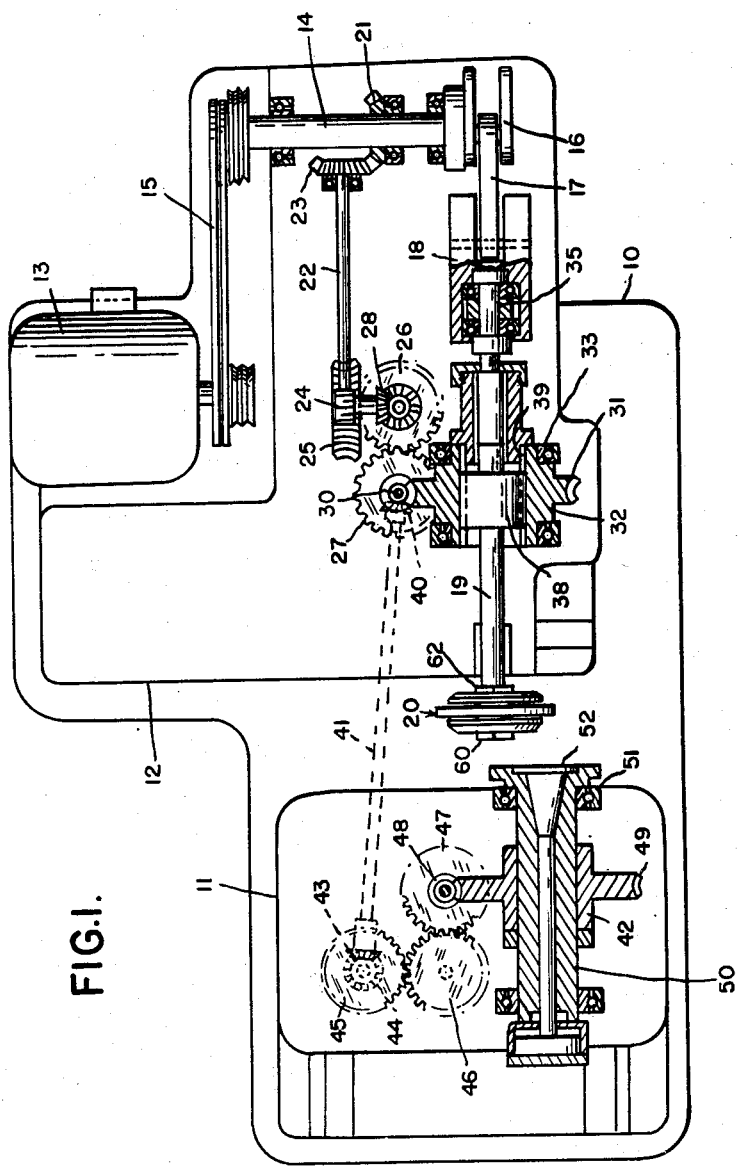
FIG.I.
INVENTOR.
WALTER S. PRAEG
BY
Whittemore, Hulbert
& Belknap ATTORNEYS

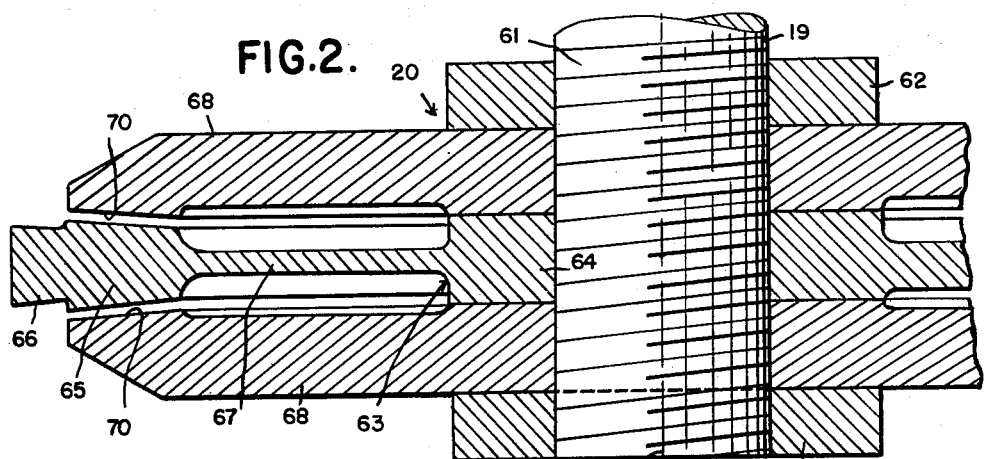
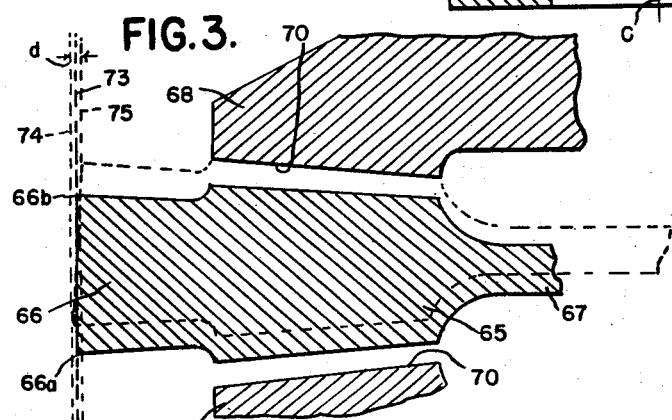
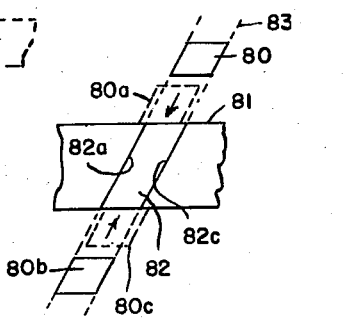
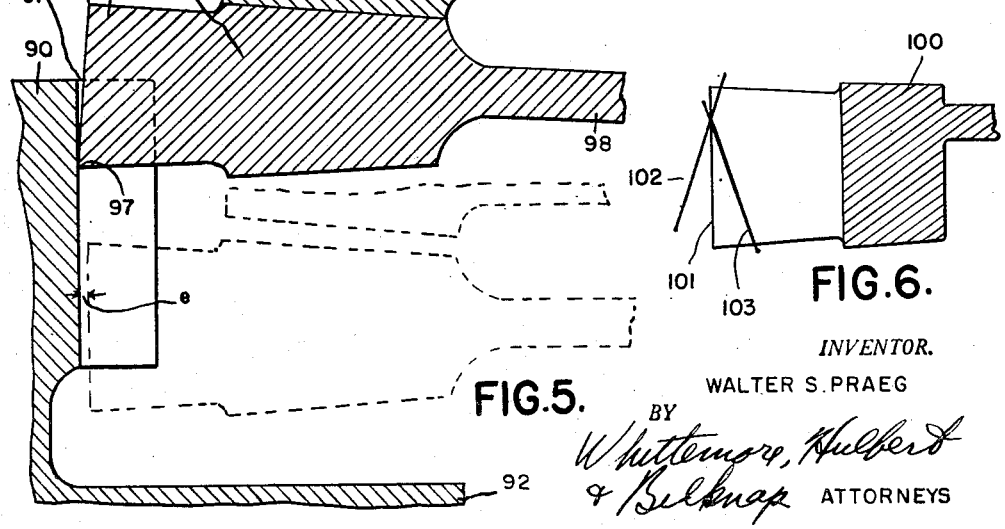

Patented July 7, 1953

2,644,367

UNITED STATES PATENT OFFICE 2,644,367

METHOD OF SHAPER CUTTING GEARS

Walter S. Praeg, Detroit, Mich., assignor, by mesne assignments, to The Fellows Gear Shaper Company, Springfield, Vt., a corporation of Vermont Application June 28, 1948, Serial No. 35,610

3 Claims. (Cl. 90—7)

The present invention relates to a shaping operation and has reference particularly to a shaping operation in which a shaping cutter is supported for movement from a neutral position to a cutting position in which it is inclined with respect to the path of cutting stroke so as to provide clearance back of the cutting edge. While the invention is applicable to an ordinary shaper operation or planing operation it finds its most advantageous expression in a shaper operation adapted to form tooth-like portions on a work piece such for example as straight or helical teeth on a cylindrical gear.

In the preferred form of the invention the cutting tool comprises three main portions; first, a rigid support portion; second, a relatively movable portion having cutting edges carried thereby; and third, a flexible portion intermediate the other two portions and adapted to permit relative movement between the cutting portions and the rigid support portion.

The invention includes a machine for carrying out the process, a new method of metal working and a specific tool. The present application is a continuation-in-part of my prior copending application Serial No. 683,650, filed July 15, 1946, and which has matured into Patent No. 2,604,016 issued July 22, 1952, and is directed to the method. A cutting tool which may be employed is described in my co-pending application No. 35,609, filed June 28, 1948.

It is an object of the present invention to provide a new method for carrying out a shaper operation in which cutting clearance is automatically provided by a relative movement of the cutter upon initiation of the cutting stroke. It is a further object of the invention to provide alternatively for substantially increased speed in the cutting operation or substantially greater accuracy of the finished product in the same time as employed by present day conventional shaping operations. It is a further object of the present invention to provide for metal shaping characterized by the provision of a shaper cutter whose life may be substantially increased by reversing the shaper cutter; characterized further by the provision of a cutter for cutting helical parts adapted to perform its cutting operation alternately on opposite sides of toothed members of a work piece; characterized further by the provision of a disc-like cutter having a rigid hub and rim interconnected by a flexible web; characterized further by a machine adapted to perform cutting strokes in both directions of relative reciprocation between a cutter and work piece; characterized further by a method of cutting employing a cutter having identical cutting edges at opposite faces thereof in which cutting clearance for the trailing face is provided by inclination of the cutter during the cutting stroke; and characterized finally by a method of cutting shoulder gears in which the cutter is inclined to a clearance position on a cutting stroke toward the shoulder and moves to a neutral clearance position on the return stroke.

Other objects and features of the invention will become apparent as the description proceeds, especially when taken in conjunction with the accompanying drawings, wherein:

Figure 1 is a diagrammatic view of a machine adapted to carry out the present invention;

Figure 2 is a fragmentary axial section showing the improved cutting tool assembly;

Figure 3 is a diagrammatic view illustrating the manner in which cutting clearance is provided;

Figure 4 is a diagrammatic view illustrating the lateral displacement of cutting teeth relative to a helical work piece so as to provide for cuts alternately on opposite sides of the teeth;

Figure 5 is a diagrammatic view illustrating the application of the present invention to the cutting of shoulder gears; and Figure 6 is a fragmentary section illustrating a modified form of cutter.

Referring first to Figure 1, there is illustrated a machine tool comprising a base 10 having mounted thereon a work support 11 and a tool support 12. The machine is of the type commonly referred to in the art as a gear shaper and is adapted to provide for relative cutting reciprocation between a cutter substantially in the form of a gear, and a gear blank. In practice the cutter while being reciprocated axially is fed into the gear blank to a predetermined depth while the cutter and gear blank are both slowly rotated; and thereafter, while relative reciprocation continues, both the cutter and the gear blank are rotated slowly with the result that the teeth of the cutter generate conjugate teeth on the work piece.

A single motor 13 is provided which drives all of the parts, as will now be described. The motor 13 rotates a shaft 14 through suitable driving connections such as a belt 15. The shaft 14 has a crank 16 which through a link 17 and a crosshead 18 is adapted to reciprocate a spindle 19 which carries the tool assembly 20.

The shaft 14 carries a bevel gear 21 which drives a shaft 22 through the medium of a meshing bevel gear 23 and the shaft 22 has as its end a worm 24 which drives a worm wheel 25. The worm wheel 25 drives a pair of meshing gears 26 and 27 through the medium of bevel gears 28. The gear 27 has a shaft to which is secured a worm 30 meshing with a worm wheel 31 formed on the outer portion of a housing 32 which is mounted for rotation in bearings indicated at 33. The crosshead 18 previously referred to has a driving connection indicated generally at 35 for reciprocating the spindle 19, the connection 35 permitting rotation of the spindle 19 relative thereto. The spindle 19 is provided with a cylindrical enlargement 38 which has teeth or splines thereon engageable in corresponding teeth or splines 39 formed on the interior of the housing 32. It will thus be apparent that rotation of the housing 32 through the medium of its worm 31 will result in a corresponding rotation of the spindle 19 and the tool assembly 20.

In the event that a gear carried by the work support 11 is being cut which has straight teeth, the teeth or splines on the enlargement 38 and the corresponding teeth or splines 39 on the interior of the housing 32 will be straight, that is, parallel to the axis of the housing 32. If, however, the teeth on the gear being cut are helical the teeth or splines on the enlargement 38 and the teeth or splines 39 on the interior of the housing 32 are helical. Accordingly, the cutter assembly 20 will be provided with a slow continuous rotation through the medium of its worm gear 31 and in addition a relative oscillation about its axis will be provided due to the reciprocation of the enlargement 38 and the helical mating surfaces formed on the member 38 and the interior of the housing 32.

In order to provide for an accurately timed rotation of the gear blank relative to the slow timed rotation of the tool assembly 20, bevel gear 40 is provided which meshes with a similar bevel gear carried by the shaft on which are mounted the gear 27 and the worm 30. The bevel gear 40 is connected to a cross shaft 41 which extends to the work support and rotates a housing 42 through the medium of bevel gears 43, 44, mating gears 45, 46 and 47, worm 48 and worm gear 49. The work supporting spindle 50 is mounted for rotation in bearings indicated at 51 and includes a chuck 52 for receiving the gear blank to be cut.

It will be apparent that the machine structure thus far described does not provide any means for effecting a relieving motion of the tool relative to the work piece on the back stroke as is now conventional. In other words, the machine is adapted to effect a cutting stroke in both directions of relative reciprocation between the work piece and the tool assembly.

In order to effect cutting in both directions of reciprocation a cutter assembly as illustrated in detail in Figure 2 is provided. In this figure the cutter spindle is indicated at 19, which is shown as provided with a threaded portion 61 on which engage clamping nuts 60 and 62. Between the clamping nuts 60 and 62 are provided the cutter 63 and a pair of annular abutment members 68. The cutter 63 is provided with a central rigid hub portion 64 which engages over the spindle 19; an outer rigid annular rim portion 65, carrying cutting teeth or elements 66; and an intermediate annular thin flexible web 67 which permits relative movement between the hub 64 and the rim 65.

The web 67 is designed such that it will permit a relative rocking movement of the rim 65 about the center of the tool assembly C when the cutting portions 66 initially engage the work piece. At the same time, the web 67 is of sufficient thickness such that it prevents any other relative movement between the hub 64 and the rim 65. It will be appreciated that when the cutting operation being performed is a gear cutting operation, that the rocking movement of the rim 65 is about an axis which is perpendicular to the axis of the cutter assembly and perpendicular to the line joining the center of the cutter assembly and the center of the gear blank and which passes substantially centrally through the cutter assembly.

By way of example, very successful gear cutting operations have been performed where the dimensions of the cutter 63 are approximately as follows: The thickness of the hub 64 is .500 inch, the thickness of the rim 65 is .484 inch, the thickness of the web 67 is .100 inch and the radial dimension of the web between the hub 64 and the rim 65 is approximately 1.5 inches.

Depending upon the dimensions of the cutter parts, there may be more or less flexing of the rim 65 in addition to or in place of the rocking motion of the rim as a unit. Thus it may be possible to obtain sufficient tipping or inclining of the teeth 66 to provide cutting clearance with less spacing between the abutments 68 and rim 65. In either case however the cutter supports the cutting teeth against undesirable lateral movement or movement radially of the cutter. The rocking of the teeth actually engaged in cutting is therefore about an axis which is perpendicular to the axis of the cutter and perpendicular to the line joining the centers of the gear blank and cutter, and located between the planes defined by the cutting edges of the cutter teeth, and between the axis of the cutter and the portion thereof engaged in cutting.

Rocking motion of the rim 65 of the cutter 63 is limited by faces 70 formed on the abutment members 68 and these faces are in the specific embodiment under discussion spaced from the adjacent faces of the rim 65 by .008 inch. It will be appreciated that the foregoing figures have been given merely to enable those skilled in the art to understand a successful embodiment of the present invention and are in no sense to be considered as limiting. As a matter of fact, it is contemplated that the thickness of the web 67 may be between .075 and .125 inch and the spacing between the faces 70 of the abutment members 68 or cooperating faces of the rim 65 may be between .003 and .015 inch.

Attention is now directed to Figure 3, which is a diagrammatic showing on an enlarged scale illustrating the manner in which cutting clearance is automatically provided. In this figure the rim 65 is illustrated in full lines in an intermediate position equally spaced from the abutment surfaces 70 of the annular members 68. The cutting portion 66 is provided with cutting edges at opposite ends thereof, the tips of the cutting edges being indicated at 66a and 66b. The profile of the cutting edges are identical so that if the cutter assembly were reciprocated vertically the tips of both edges would follow in the tracing indicated by the broken line 73. If now the cutter 63 is moved downwardly until its lower cutting edge having the corner 66a engages a work piece the rim 65 will rock until the rim 65 engages the surface 70 of the uppermost angular member 68. At this time the corners 66a and 66b will have rocked about the center C to the position indicated in dotted lines and it will be observed that the corner 66a will now follow the trace 74 and the corner 66b will follow the trace 75. In other words, cutting clearance for the corner 66b in an amount indicated by the dimension d is provided. It will of course be apparent that in the case of a cutter having cutting portions 66 in the form of gear teeth, the cutting clearance provided at the sides of the teeth will be a function of the angularity of these surfaces with radial planes. In other words, a portion of the cutter tooth surface which occupies a plane perpendicular to the radius of the cutter will have a maximum amount of cutting clearance. In like manner, a portion of the cutter tooth occupying a truly radial plane would be provided with no clearance by this rocking motion. In practice, however, there are no radial surfaces provided so that some cutting clearance is provided in back of every portion of each of the cutting edges by the rocking motion of the rim 65. In the event that none of the cutting edges approximate radial lines it may be that no additional cutting clearance need be provided. However, in some cases it may be desirable to modify the sides of the teeth as by hollow grinding so as to provide additional clearance directly in back of the cutting edge. In all cases, however, the cutting clearance for the trailing or inactive cutting edge will result solely from inclination of the cutter relative to the path of relative reciprocation.

In the case of the specific cutter whose dimensions were given above the tip of the cutter tooth was provided with a hollow whose depth at its center midway between the cutting edges of the tip was .001 inch and the sides of the cutting teeth were provided with a hollow which amounted to approximately .002 inch midway between the cutting edges.

It is desired to emphasize, however, that in many cases no additional clearance need be ground into the cutting teeth, with the result that an extremely inexpensive cutter results, the side surfaces of the cutting teeth being ground so that each tooth is of uniform thickness throughout.

It is desired at this time to mention a prime advantage of the present method of shaping. It is inherent in this type of shaping where it is used to shaper cut gear teeth that a major portion of the cutting action is done by the leading corners of the cutting teeth. In accordance with the present invention the cutter is reversible and sometime prior to dulling of the leading corners of the cutter teeth the cutter may be reversed so that the opposite corners of its teeth will become the leading corners and thus subjected to the heaviest cutting strain.

It will be appreciated that cutting performed by this improved cutter may be substantially twice as rapid as conventional cutting which takes place in one direction only and in which cutting stroke is followed by back-out of the tool and a return idle stroke. As a matter of fact, it is possible to reduce cutting time to somewhat less than half of that previously required for the reason that some time is involved in the backing out of the tool from the work prior to the idle stroke and this of course is totally avoided in the present invention.

If instead of employing the cutter in a manner to reduce the cutting time to a minimum, the rate of rotation is kept substantially equal to the relative rotation in single stroke cutting, it will be appreciated that the result will be to produce a finished gear tooth of very substantially increased accuracy due to the fact that the number of cuts per unit area of surface have been doubled.

Referring now to Figure 4, there is illustrated a novel manner of cutting helical gear teeth which results from employing the cutter described herein in conjunction with helically formed teeth 80 thereon. In this figure a portion of the work gear is indicated at 81 and at 82 there is illustrated a tooth space in which the cutter tooth 80 is operated. It will be appreciated that in this operation the shaper is one in which the tool spindle 19 has an enlargement 38 which is provided with helical teeth or splines thereon for cooperation with similar teeth or splines 39 formed on the interior of the rotatable housing 32. In Figure 4 it may be assumed that the cutter tooth 80 is first moved downwardly along a path 83 which for clarity is developed into a straight line path and that due to the feed between the tool and cutter the tooth 80 will engage metal at the sides of the tooth slot 82 formed in the blank 81. Upon initial engagement of the tooth 80 and the upper surface of the gear blank 81 the cutter will rock about the axis previously described until such time as the rim of the cutter engages the abutment surface 70 thereabove. During this rocking motion of the rim of the cutter, an additional slight rotation of the cutter assembly will result from the continued downward movement of the hub portion thereof. This slight additional downward movement of the hub portion of the cutter results in lateral displacement of the cutter tooth 80 to the position indicated in dotted lines at 80a, which it will be observed is slightly offset with respect to the tooth space 82. Continued movement of the tooth 80 and the cutting stroke will therefore remove metal from the side of the tooth slot designated 82a and there will be clearance between the other side of the tooth 80 and the other side of the tooth slot 82. When the tooth 80 passes out of the other end of the tooth slot 82 and the pressure between the work piece and the cutter is released, the rim of the cutter will immediately spring back to its intermediate position and the cutter tooth will again align itself with the tooth space as indicated at 80b.

In like manner, upon the reverse stroke the cutter tooth 80 will follow the path of the tooth space 83 until such time as the other end of the cutter tooth 80 engages the lower surface of the blank 81, at which time there will follow a small lateral displacement to the position indicated at 80c. In this position the cutter tooth 80 is effective to cut the other side 82c of the tooth slot, there being clearance between the side of the tooth 80 and the side of the tooth space 82a. This is a very desirable feature in cutting helical gears and one which is inherent from the use of a cutter having the characteristics disclosed herein.

Referring now to Figure 5, there is illustrated a method of cutting shoulder gears which employs a cutter of the type disclosed herein. In this case a gear blank 90 on which teeth 91 are to be formed and which has a shoulder 92 provided thereon adjacent one end of the teeth 91, is being cut by a cutter 93 rockably positioned adjacent an abutment 94. As will be observed from Figure 5, rocking motion of the cutter 93 into engagement with the abutment 94 tips the cutter blade 95 so that the upper cutting corner 96 is moved into a clearance position with respect to the lower cutting corner 97. Upon completion of the stroke, when the lower cutting corner 97 passes out of the toothed portion 91 of the blank, the flexible web 98 of the cutter will cause the cutter to assume a neutral position in which the corners 96 and 97 are in alignment with the direction of relative reciprocation and clearance as indicated at e is thus provided for the return stroke. It will be observed that in this case cutting takes place only on the down stroke of the cutter assembly and clearance is automatically provided for the return idle upper stroke. This clearance, however, is provided automatically due to the resilience of the thin web 98 and there is no necessity for backing the cutter assembly out of the tooth slot as in present conventional practice.

In the latter case while the cutter portion 95 has been indicated as having upper and lower cutting edges 96 and 97 it will be appreciated that if desired only the lower surface of the cutting portion 95 need be provided with cutting edges and that in back of these cutting edges the tooth could be backed off as desired to provide cutting clearance. However, it is preferable to provide the tooth with cutting edges at opposite ends of each cutting tooth so that the cutter may be reversed as one set of cutting edges becomes dull.

As so far described, web 67 or 98 is located midway between the planes of the sides of the cutter, but in some cases the web may be nearer one side of the cutter than the other. Thus in Figure 6, web 100 is located nearer to the plane of the top ends of teeth 101 than to the plane of the bottom ends of said teeth. This results in differential radial displacement of the top and bottom ends of said teeth, as suggested by dotted lines 102 and 103. Lines 102 and 103 represent in an exaggerated way the position of the teeth during cutting on down and up strokes respectively. This may result in alternating roughing and finishing cuts, or may be particularly useful in cutting shoulder gears as described above.

While I have described in considerable detail a specific machine, method and cutter assembly to be used in conjunction with the shaper cutting of gears, it will be appreciated that the invention is of broader scope and is applicable to other types of shaper cutting such for example as ordinary planing. It will further be appreciated that the present detailed description of my improved method, machine and tool has been given to enable those skilled in the art to practice the invention, the scope of which is indicated by the appended claims.

What I claim as my invention is:

1. The method of shaper cutting helical gears with a gear-like cutter having helical teeth tiltable upon cutting contact with respect to the central portion of the cutter about an axis perpendicular to the axis of the cutter and a radial line passing through the teeth in cutting contact which comprises rotating the cutter and a gear blank in timed relation, relatively reciprocating the central portion of the cutter and gear in cutting relation in a direction parallel to the axis of the cutter, and displacing the cutting teeth a small distance circumferentially in opposite directions upon cutting strokes in opposite directions by tilting the cutting teeth about an axis perpendicular to the axis of the cutter and to a line joining the centers of the gear blank and cutter to cut one side only of the gear teeth at one time.

2. The method of shaper cutting helical gears which comprises relatively reciprocating a gear blank and a cutter having an annular cutter portion having helically formed cutter teeth provided with cutting edges at opposite ends thereof, effecting a slow timed relative rotation between said blank and cutter, superimposing an additional timed rotation between said blank and cutter to compensate for the relative reciprocation and helix angle of the teeth, and providing a relative rocking motion prior to the initiation of a cut in either direction between the cutter and blank about an axis perpendicular to the direction of relative reciprocation and perpendicular to the line joining the centers of cutter and blank and in a direction to provide cutting clearance for the trailing edge of the cutter teeth, said relative rocking being effective as a result of the helical disposition of the cutter teeth to cause cuts to be taken alternately by opposite sides of the cutter teeth.

3. The method of shaper cutting helical gears which comprises relatively reciprocating a gear blank and a cutter having a rigid rib portion having inclined cutting teeth thereon, effecting a relatively slow generating movement between said blank and cutter, superimposing an additional timed movement between said blank and cutter to compensate for the relative reciprocation of cutter and blank and the inclination of the cutting teeth, and providing a relative rocking motion to said cutting teeth prior to the initiation of the cut in a direction to provide cutting clearance for the trailing edge of the cutter teeth, said relative rocking being effective as a result of the inclination of the cutter teeth to cause cutting by one side only of the cutter teeth at one time.

WALTER S. PRAEG.

References Cited in the file of this patent

UNITED STATES PATENTS

| Number | Name | Date |
|---|---|---|
| 2,029,399 | Try | Feb. 4, 1936 |
| 2,369,361 | Marx | Feb. 13, 1945 |
| 2,386,572 | Pigott | Oct. 9, 1945 |
| 2,432,020 | Laesser | Dec. 2, 1947 |